UNITED STATES PATENT OFFICE.

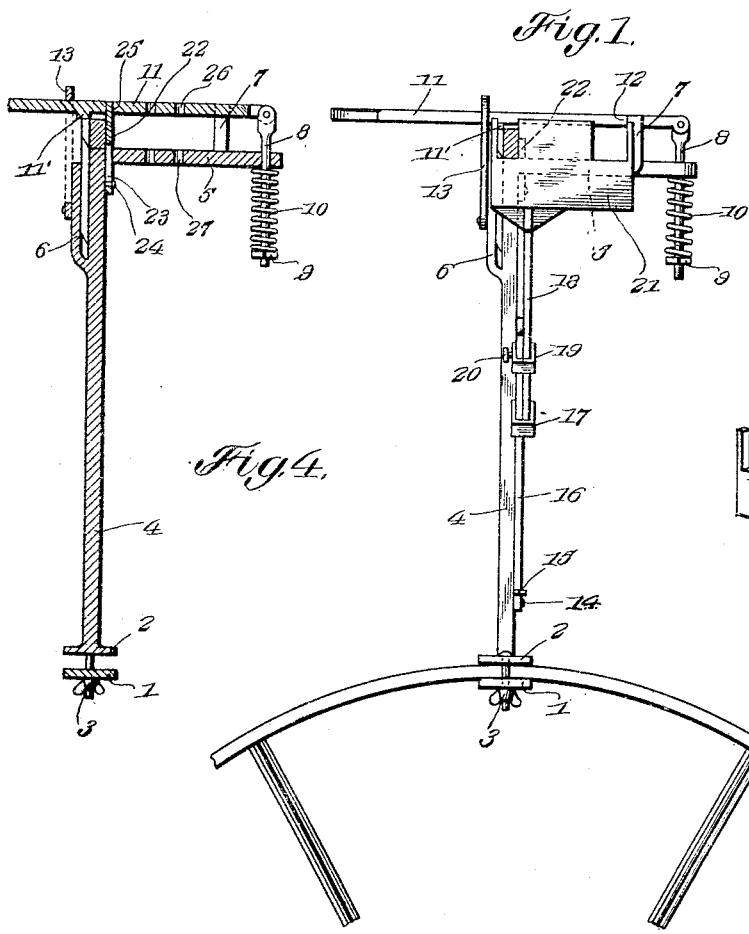

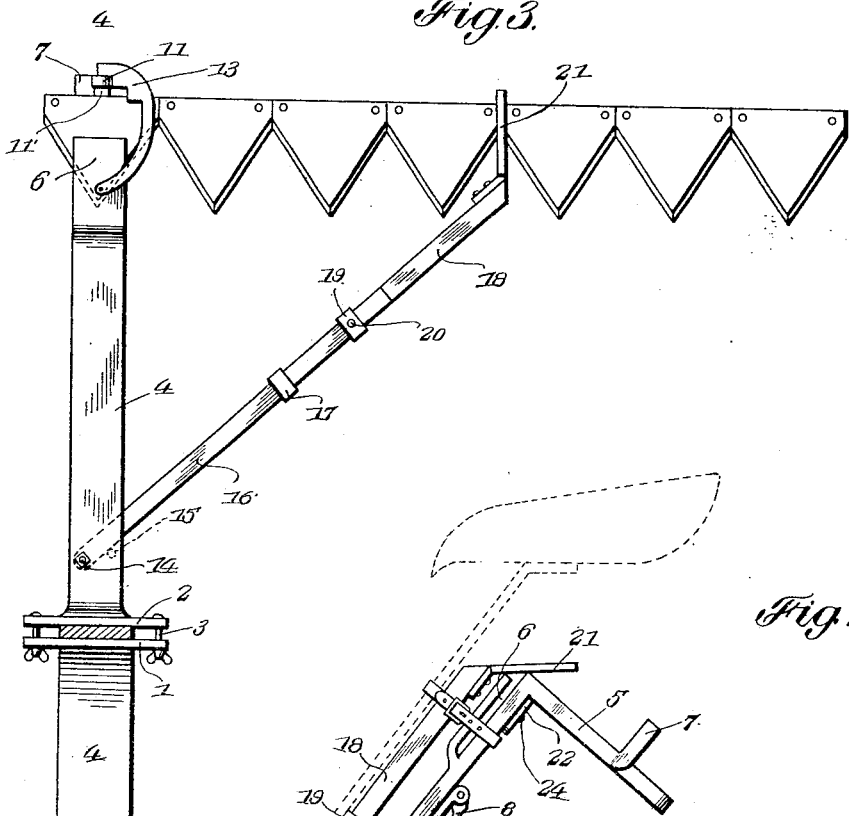
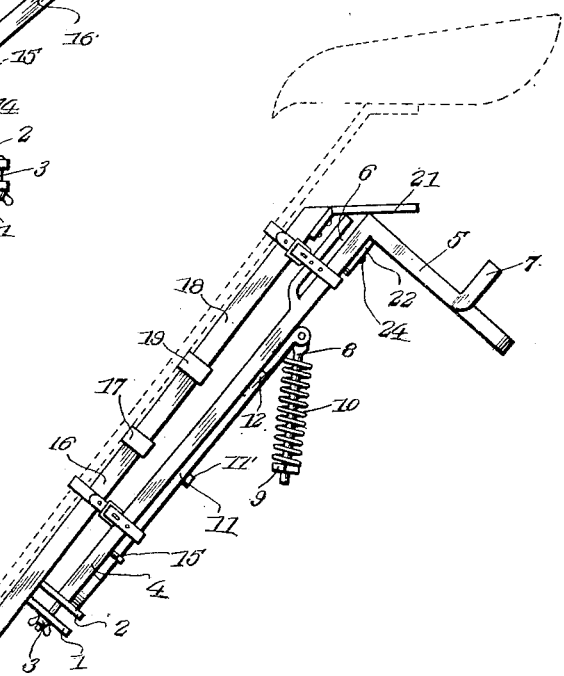

JOHN WATKINS, OF DYKES, MISSOURI.

SICKLE-BAR HOLDER.

1,108,039.     Specification of Letters Patent.     Patented Aug. 18, 1914.

Application filed September 23, 1913. Serial No. 791,355.

*To all whom it may concern:*

Be it known that I, JOHN WATKINS, a citizen of the United States, residing at Dykes, in the county of Texas and State of Missouri, have invented new and useful Improvements in Sickle-Bar Holders, of which the following is a specification.

This invention has relation to holders for sickle bars and it consists in the novel features hereinafter described and claimed.

An object of the invention is to provide a holder of the character indicated, the parts of which are collapsible or foldable in order that the holder may be readily attached to the seat post or other part of the frame of a mower, harvester or binder for transportation. Frequently when the harvester or mower is out in the field one or more blades on the sickle bar will break and the butt ends of these blades should be removed promptly from the bar and new blades inserted in their stead. Under the practice now in vogue it is necessary to detach the sickle bar from the machine and carry the same to the shop where the broken blades are removed and new ones applied. By using the present invention the holder is removed from that part of the frame of the machine at which it is carried and is positioned upon the rim of one of the wheels. The sickle bar having the broken parts is then applied to the holder and by using a hammer and punch the broken blades may be removed and new blades quickly applied. Therefore the use of the holder hereinafter to be described will save considerable time in the event of accident or breakage of the parts carried by the sickle bar. Furthermore the holder may be conviently used for holding straps, and other articles when it is desired to apply rivets or staples to the same.

In the accompanying drawings: Figure 1 is an edge elevation of the holder showing the same applied to the rim of a wheel. Fig. 2 is a view of the holder showing the parts thereof collapsed or folded and secured to the seat post of a mower or other machine for transportation. Fig. 3 is a side elevation of the holder. Fig. 4 is a vertical sectional view of the holder. Fig. 5 is a top plan view of the holder. Fig. 6 is a perspective view of an end portion of a work support used on the holder.

The holder comprises clamp members 1 and 2 which are adapted to be connected together at their end portions by means of clamp bolts 3. A standard 4 is mounted upon the clamp member 2 and carries at its upper end an anvil 5. The standard 4 is provided at one side with a guide 6 which is adapted to receive the blade of the sickle bar when the bar is secured in position upon the anvil as will be hereinafter explained.

Guide lugs 7 are mounted upon the upper surface of the anvil 5. A pin 8 passes through the anvil at a point in a line approximately midway between the lugs 7. A nut 9 is screw threaded upon the lower end of the pin and a spring 10 is interposed between the said nut and the under side of the anvil. The said spring is under tension with a tendency to force the nut 9 away from the anvil. A lever 11 is pivoted to the pin 8 at a point above the upper side of the anvil and is adapted to be swung down between the guide lugs 7. The said lever is provided at its opposite side edges with shoulders 12 which are adapted to engage the edges of the lugs 7 when the lever is swung down and thus the said lugs and lever engage with each other whereby the lever is held against longitudinal movement when it is swung down toward the anvil. A hook 13 is pivotally mounted upon the standard 4 or its guide 6 as shown and it is adapted to be engaged with the free end portion of the lever 11 when the said lever is swung down toward the anvil and hold the free end portions of the said lever in the said depressed position.

The standard 4 is provided at its lower end portion with a pin 14 and adjacent the said pin with a stop 15. An arm section 16 is adapted to be mounted upon the pin 14 and may rest against the stop 15 whereby the said section is supported at an acute angle to the length of the standard 4. The arm section 16 is provided with a band or loop 17 which slidably receives an arm section 18 also provided with a band or loop 19. The last mentioned band or loop slidably receiving the arm section 16. A set screw 20 passes transversely through the arm section 16 and is adapted to engage at its inner end the side of the arm section whereby the said arm section may be held at adjusted positions with relation to each other. The arm section 18 is provided at its upper end with a head 21. The sections 16 and 18 together with the head 21 serve as a work support when the parts are positioned as shown in Fig. 3 of the drawing.

A pin 22 is slidably mounted against the side of the standard 4 immediately below the anvil 5. The upper end of the said pin passes through the anvil and the pin 22 is provided at its lower end portion with an elongated slot 23 which receives a pin 24 fixed to the standard. The lever 11 is provided with an opening 25 which is adapted to receive the upper end portion of the pin 22 when the same is projected above the upper surface of the anvil 5. Thus means is provided for securely holding the free end portion of the lever 11 when the same is swung down toward the upper side of the anvil 5.

In operation the clamp members 1 and 2 are placed against the opposite sides of the wheel rim of a mower or harvester and the bolts 3 are tightened whereby the said clamping members are securely engaged with the wheel. The arm section 16 is then mounted upon the pin 14 and swung over against the stop 15. By loosening the set screw 20 the arm section 18 may be adjusted so that the head 21 may be positioned in the same plane as that occupied by the upper surface of the anvil 5. Presuming now that some of the blades upon a sickle bar have been broken it is desired to remove the same. The sickle bar is placed on edge upon the upper surface of the anvil 5 and the blades are disposed downwardly whereby the guide 6 may receive one of the blades. Another of the blades of the sickle bar may rest upon the head 21. The lever 11 is then swung in a downward direction so that its intermediate portion encounters the upper edge of the sickle bar which is resting upon the anvil 5. The lever is then turned down to engage the rear edge of the sickle bar and the free end portion of the lever is engaged by the hook 13. At the same time that end of the lever 11 which is connected with the pin 8 moves in an upward direction against the tension of the spring 10 and thus the sickle bar is securely held. Then by using a hammer and chisel or punch the rivet securing the broken portion of the blade to the sickle bar may be removed and new blades substituted in the place of the broken blades. The lever 11 is further provided upon its lower or under side with a bar or lug 11′ which may be brought down upon the edge of a blade as shown in Fig. 4. When the parts are so positioned blows with a hammer may be struck upon the upper side of the lever whereby the blade may be knocked from the sickle bar. Furthermore the lever 11 may be provided with numerous openings 26 through which punchers of different patterns may be inserted for heading or spreading rivets of different patterns when the blades are secured upon the sickle bars or when it is desired to remove the portions of the rivets from the sickle bar after they have been cut. The anvil 5 is provided with corresponding openings 27 adapted to receive the ends of the rivets or the punchers. Any suitable form of punch may be employed but the forms of punches most generally used will be one that is hollow and one that is solid at its work engaging end. After the holder has been used as hereinbefore indicated it may be removed from the wheel of the mower or other machine and the parts can then be collapsed or folded and secured by tying or otherwise to the seat post of a harvester or other part of the frame thereof.

Having described the invention what is claimed is:—

1. A holder comprising a standard, means for securing the standard to an object, an anvil mounted upon the standard, a lever pivotally connected with the anvil and adapted to hold an object on the anvil and a work support connected with the standard and adapted to be disposed at an acute angle with relation to the long dimension of the same.

2. A holder comprising a standard, means for securing the standard to an object, an anvil mounted upon the standard, a lever pivoted upon the anvil and adapted to hold an object on the anvil and a work support pivotally connected to the standard and being longitudinally extensible.

3. A holder comprising a standard, means for securing the standard to an object, an anvil mounted upon the standard, a lever pivoted to the anvil and adapted to hold an object on the anvil and a hook pivoted upon the standard and engageable with the free end portion of said lever.

4. A holder comprising a standard, means for securing the standard to an object, an anvil carried by the standard, a spring pressed pin movably mounted in the anvil, a lever pivoted to said pin and adapted to swing over the anvil and adapted to hold an object on the same.

5. A holder comprising a standard, means for securing the standard to an object, an anvil mounted upon the standard and having spaced lugs, a lever pivotally connected with the anvil and having shoulders engageable with said lugs said lever adapted to hold an object on the anvil.

6. A holder comprising a standard, means for securing the standard to an object, an anvil carried by the standard, a lever pivoted to the anvil and adapated to hold an object on the anvil and having an opening and a pin slidably mounted upon the anvil and adapted to enter the opening in the lever.

7. A holder comprising a standard, means for securing the standard to an object, an anvil mounted upon the standard, lugs mounted upon the anvil, a lever pivotally connected with the anvil and adapted to hold an object on the anvil and provided with shoulders adapted to engage the lugs, a slotted pin slidably mounted with relation to the anvil, a set screw passing through the slot of the pin and engaging the standard, said lever having an opening adapted to receive the end portions of the pin and means for securing the free end portion of the lever with relation to the standard and anvil.

In testimony whereof I affix my signature in presence of two witnesses.

JOHN WATKINS.

Witnesses:
 CLARA WILSON,
 HENRY WILSON

Copies of this patent may be obtained for five cents each, by addressing the "Commissioner of Patents, Washington, D. C."